(12) United States Patent
Funai (10) Patent No.: US 8,375,823 B2
(45) Date of Patent: Feb. 19, 2013

(54) BICYCLE SHIFT CONTROL DEVICE

(75) Inventor: Shingo Funai, Sakai (JP)

(73) Assignee: Shimano Inc., Osaka (JP)

( * ) Notice: Subject to any disclaimer, the term of this patent is extended or adjusted under 35 U.S.C. 154(b) by 1650 days.

(21) Appl. No.: 11/492,848

(22) Filed: Jul. 26, 2006

(65) Prior Publication Data

US 2008/0022803 A1    Jan. 31, 2008

(51) Int. Cl.
*F16C 1/10*    (2006.01)
(52) U.S. Cl. ..................................... 74/502.2
(58) Field of Classification Search ............ 74/502.2, 74/488, 489, 575–577 M
See application file for complete search history.

(56) References Cited

U.S. PATENT DOCUMENTS

| | | |
|---|---|---|
| 5,186,071 A | 2/1993 | Iwasaki |
| 5,241,878 A | 9/1993 | Nagano |
| 5,257,683 A | 11/1993 | Romano |
| 5,400,675 A | 3/1995 | Nagano |
| 5,601,001 A | 2/1997 | Kawakami et al. |
| 5,730,030 A | 3/1998 | Masui |
| 5,732,593 A | 3/1998 | Hwang et al. |
| 5,802,923 A | 9/1998 | Hara |
| 5,957,002 A | 9/1999 | Ueng |
| 6,066,057 A | 5/2000 | Nakamura et al. |
| 6,073,730 A | 6/2000 | Abe |
| 6,216,078 B1 | 4/2001 | Jinbo et al. |
| 6,502,477 B1 * | 1/2003 | Assel ........................ 74/502.2 |
| 6,647,823 B2 | 11/2003 | Tsumiyama et al. |
| 2004/0005947 A1 | 1/2004 | Shahana et al. |
| 2004/0144193 A1 | 7/2004 | Sato et al. |

FOREIGN PATENT DOCUMENTS

| | | |
|---|---|---|
| DE | 690 14 159 T2 | 3/1995 |
| DE | 695 02 644 T2 | 3/1999 |
| DE | 697 16 787 T2 | 11/2003 |
| EP | 0 352 733 A2 | 1/1990 |
| EP | 0 406 813 A2 | 1/1991 |
| EP | 1 264 764 A2 | 12/2002 |
| EP | 1 527 989 A2 | 5/2005 |
| EP | 1 564 131 A1 | 8/2005 |
| EP | 1 640 262 A2 | 3/2006 |
| EP | 1 726 520 A2 | 11/2006 |
| EP | 1 772 364 A1 | 4/2007 |
| GB | 602 711 A | 6/1948 |

* cited by examiner

*Primary Examiner* — Richard W Ridley
*Assistant Examiner* — Daniel Yabut
(74) *Attorney, Agent, or Firm* — Global IP Counselors, LLP (57) ABSTRACT

A bicycle shift control device is provided with a stroke controlling structure that provides distinct shifting position for an operating member that is pivotally arranged to move between a rest position, a first shifting position and a second shifting position. The stroke controlling structure includes a guide member configured and arranged to stop movement of the operating member at the first shifting position when the operating member is progressive moved in the single operating direction from the rest position. The guide member is further configured and arranged to control further movement of the operating member from the first shifting position to the second shift position when the operating member is moved in a non-operating direction away from the first shifting position without returning to the rest position.

20 Claims, 11 Drawing Sheets

BICYCLE SHIFT CONTROL DEVICE

BACKGROUND OF THE INVENTION

1. Field of the Invention

This invention generally relates to a bicycle control device. More specifically, the present invention relates to a bicycle control device that performs two shifting operations without returning the shift lever to the rest position.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for shifting have been extensively redesigned in recent years.

Currently, there are many types of cable operated shifting devices currently being installed on bicycles. For example, some cable operated shifting devices have a pair of shift levers and a cable winding mechanism that rotates via a ratchet mechanism. With conventional cable operated shifting devices of this type, operation of one of the shift lever causes the cable winder to rotate via the ratchet mechanism in one direction by one gear at a time. As a result, the cable is wound around the cable winder, and a shift is made by the shift mechanism from one gear to the next gear. Operation of the other shift lever causes the ratchet mechanism to be released and the cable winder to rotate in the other direction by one gear at a time. As a result, the cable that was wound on the cable winder is played out, and a shift is made in the opposite direction by the shift mechanism.

More recently, some cable operated shifting devices have been developed that allow multiple gear shifts in a single operation of one of the shift levers. Some of these prior shifting devices can be complicated and expensive to manufacture and assemble. Furthermore, these prior shifting devices are sometimes heavy and/or cumbersome. Also with some of prior shifting devices is difficult for rider to easily control the number of gear positions that are shifted in a single shifting stroke. It is desirable for the rider to be able to easily shift only one gear at a time if needed and/or desired without accidentally two or more gears by pushing or pulling the shift lever too far.

In view of the above, it will be apparent to those skilled in the art from this disclosure that there exists a need for an improved bicycle control (shifting) device. This invention addresses this need in the art as well as other needs, which will become apparent to those skilled in the art from this disclosure.

SUMMARY OF THE INVENTION

One object of the present invention is to provide a bicycle control device for pulling and releasing a wire of a shift cable with the bicycle control device being simple to operate such that multiple gear shifts can be performed in a single gear shifting operation.

Another object of the present invention is to provide a bicycle control device for shifting a bicycle transmission that is relatively simple and inexpensive to manufacture and assemble.

The foregoing objects can basically be attained by providing a bicycle shift control device that basically comprises an operating member, a release pawl, a ratchet member, a wire take up member and a stroke controlling structure. The operating member is pivotally arranged to move between a rest position, a first shifting position and a second shifting position with the first shifting position being located between the rest position and the second shifting position with respect to movement of the operating member along a single operating direction. The release pawl is operatively coupled to the operating member to move in response to movement of the operating member. The ratchet member includes a plurality of ratchet teeth that are selectively engaged by the release pawl. The wire take up member is configured and arranged to rotate about a rotational axis in response to movement of the ratchet member by the release pawl in response to the movement of the operating member along the single operating direction. The stroke controlling structure includes a guide member configured and arranged to stop movement of the operating member at the first shifting position when the operating member is progressive moved in the single operating direction from the rest position such that the release pawl engages one of the ratchet teeth. The guide member is further configured and arranged to control further movement of the operating member from the first shifting position to the second shift position when the operating member is moved in a non-operating direction away from the first shifting position such that the release pawl operatively engages the one of the ratchet teeth during pivoting of the operating member from the first shifting position to the second shift position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
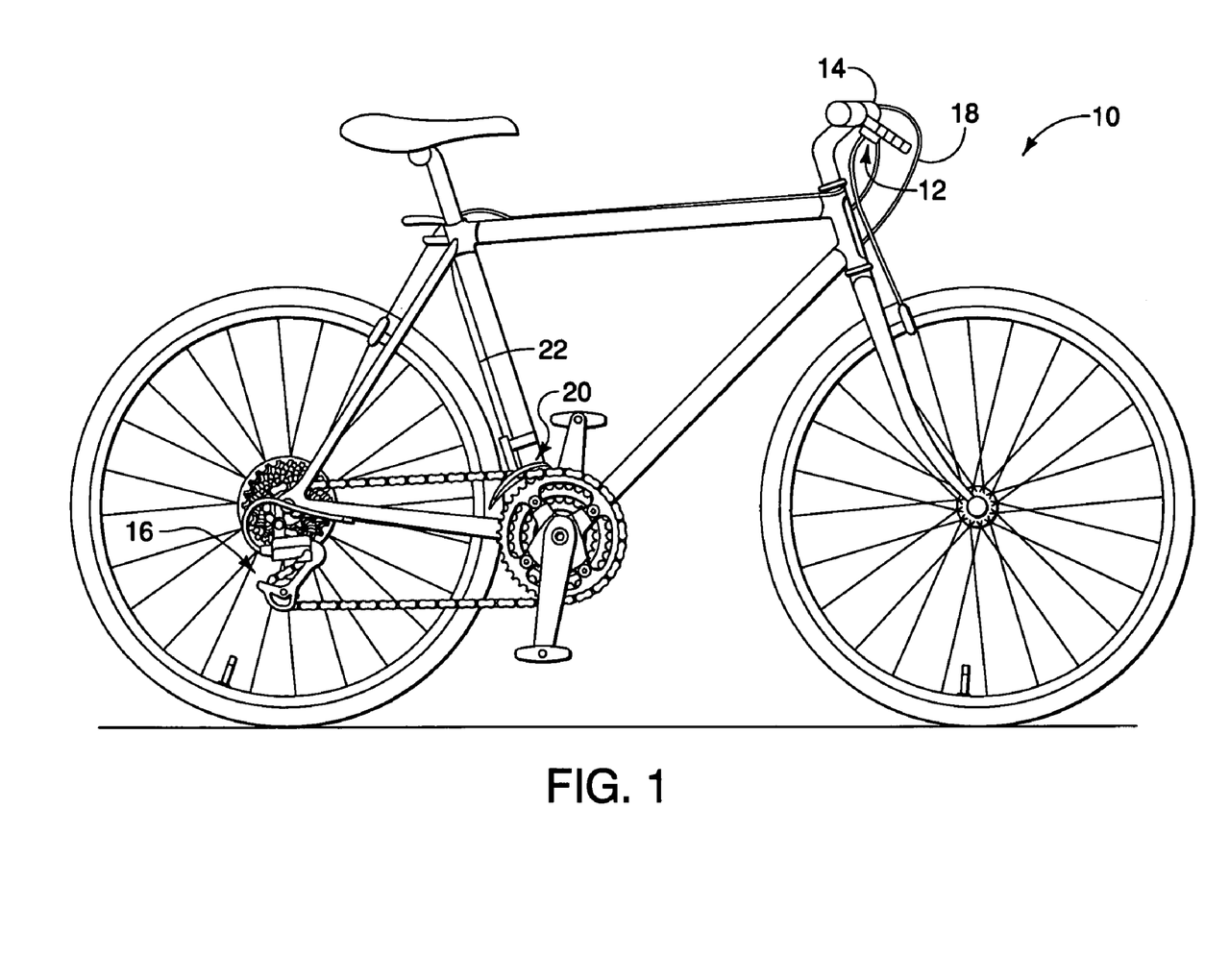
FIG. 1 is a side elevational view of a bicycle equipped with a pair of control devices (only one shown) in accordance with one embodiment of the present invention.

Referring initially to FIG. 1, a bicycle 10 is illustrated with a bicycle control device 12 mounted on a bicycle handlebar 14 in accordance with one embodiment of the present invention. The bicycle control device 12 is a right hand side control device 12 operated by the rider's right hand. The bicycle control device 12 is preferably operatively coupled to a rear derailleur 16 via a shift control cable 18.

Preferably, the bicycle 10 includes a left hand side bicycle control device (not shown) that is substantially identical to the bicycle control device 12, except for the shifting unit has been modified to reduce the number of gears that can be shifted. Preferably, the left hand side bicycle control device is operatively coupled to a front derailleur 20 via a shift control cable 22. Alternatively, the control devices can be switched so that the rider can operate the rear derailleur 16 and the front derailleur 20 with opposite hands. In any event, the left hand side bicycle control device is essentially identical in construction and operation to the control device 12, except that it is a mirror image of the control device 12 and the number of shift positions for the left hand side bicycle control device is different. Thus, only the control device 12 will be discussed and illustrated herein. Preferably, the cables 18 and 22 are conventional bicycle cables that have an outer casing the covers an inner wire. For example, the shift control cable 18 has an inner wire 18a and an outer casing 18b.

Since most of the parts of the bicycle 10 are well known in the art, the parts of the bicycle 10 will not be discussed or illustrated in detail herein, except for the parts that relate to the present invention. In other words, only the parts related to the bicycle control device 12 will be discussed and illustrated in detail herein. Moreover, various conventional bicycle parts such as brakes, additional sprockets, derailleurs, etc., which are not illustrated and/or discussed in detail herein, can be used in conjunction with the present invention.

Referring now to FIGS. 2-6, the bicycle control device 12 is illustrated in the rest position. The bicycle control device 12 basically includes a bicycle handlebar mounting portion 31, a braking unit 32 and a shifting unit 33. In this embodiment, the braking unit 32 and the shifting unit 33 are integrated into the handlebar mounting portion 31. The handlebar mounting portion 31 and the shifting unit 33 constitutes a bicycle shift control device of the present invention.

Figure 2:
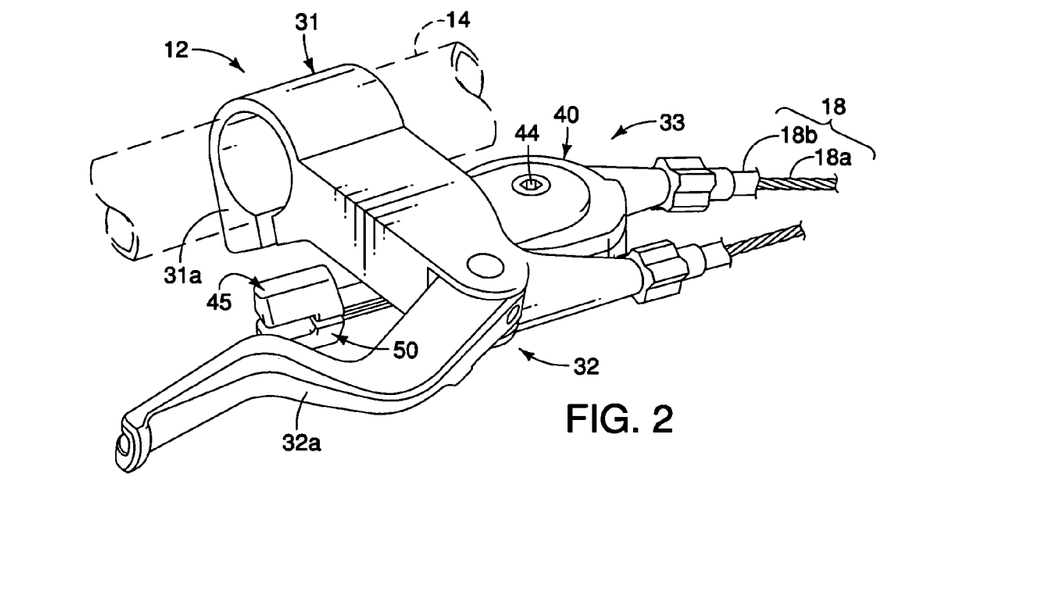
FIG. 2 is an enlarged perspective view of the bicycle control device illustrated in FIG. 1 in accordance with the present invention.
Figure 3:
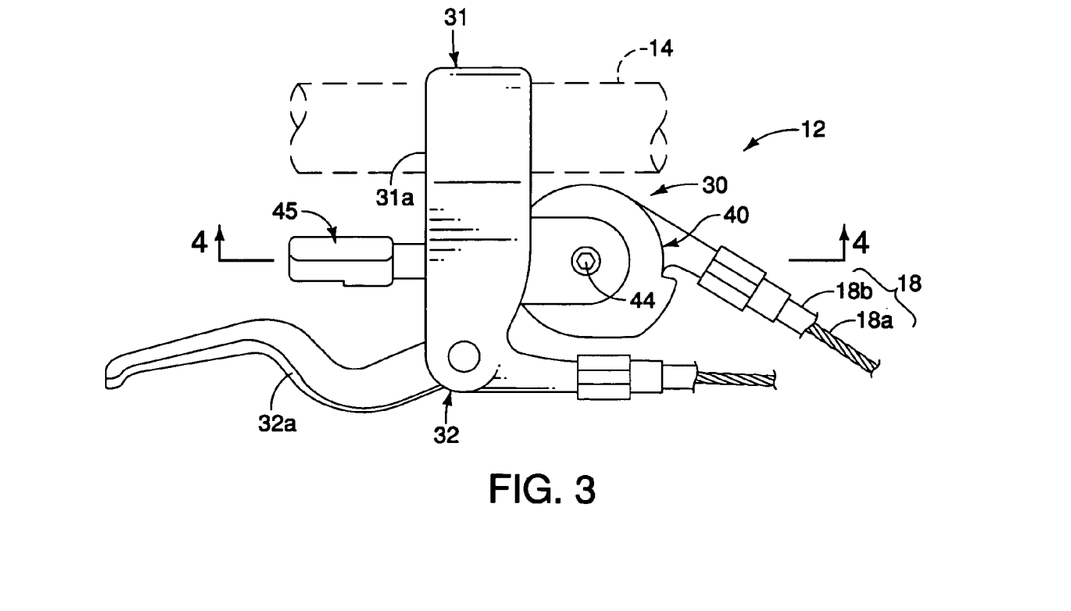
FIG. 3 is a top plan view of the bicycle control device illustrated in FIGS. 1 and 2, with the operating members (shift levers) in the rest position.

As best seen FIG. 2, the handlebar mounting portion 31 has a clamping section 31a that is preferably a split bore type of clamping arrangement in which the diameter of the bore is varied by a fixing bolt in a conventional manner. The clamping section 31a is relatively conventional in construction, and thus, will not be discussed or illustrated in further detail herein.

The braking unit 32 has a brake lever 32a that is pivotally mounted to the bicycle handlebar mounting portion 31 to pull and release an inner wire of a brake cable in a conventional manner. The configuration of the braking unit 32 can be any configuration, and thus, will not be discussed in further detail herein. In fact, the braking unit 32 can be eliminated from the bicycle control device 12 as needed and/or desired.

Figure 6:
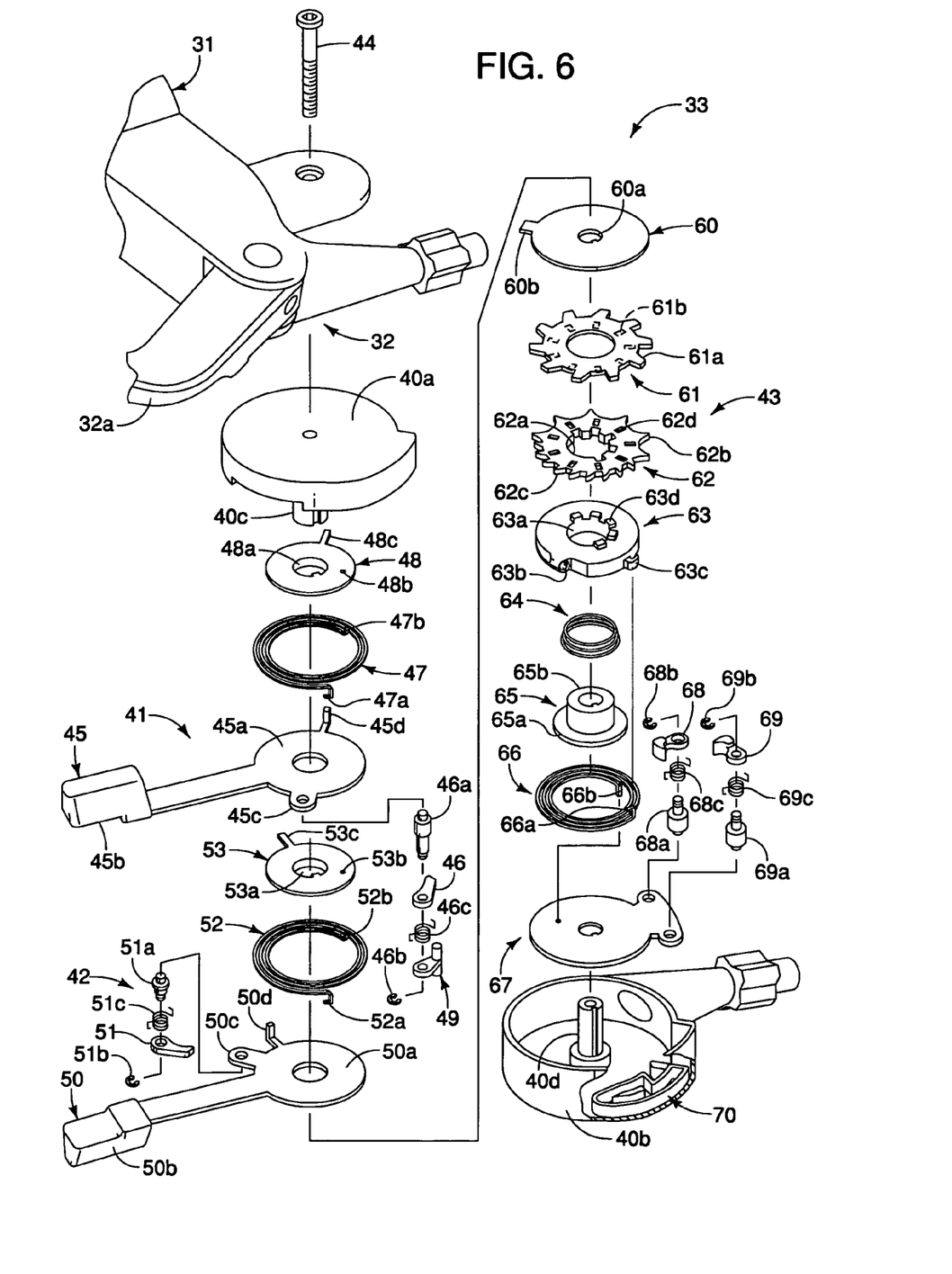
FIG. 6 is an exploded perspective view of the bicycle control device illustrated in FIGS. 1-5 in accordance with the present invention.
Figure 7:
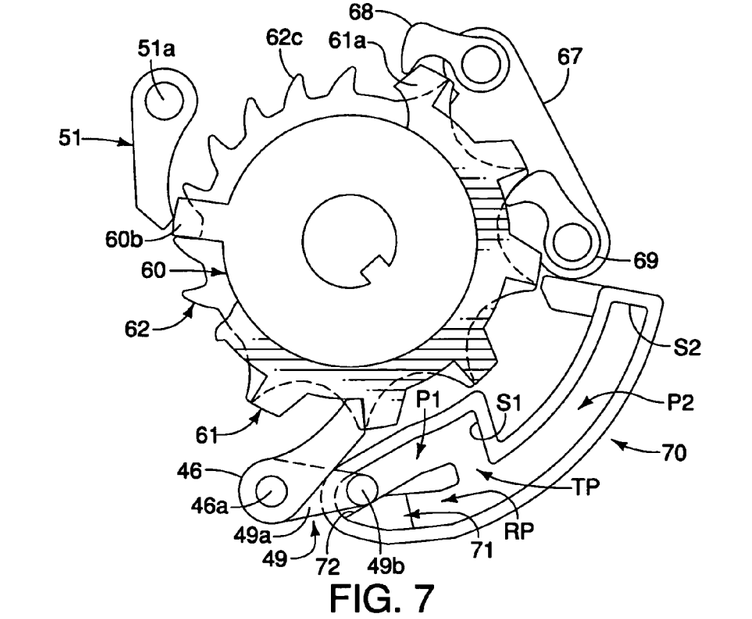
FIG. 7 is a simplified top plan view of selected parts of the shift position control mechanism for the bicycle control device illustrated in FIGS. 1-6, with the bicycle control device in its normal rest position when the bicycle control device is in the first gear position, i.e., the inner wire of the rear shift cable being fully released from the wire take up member.
Figure 8:
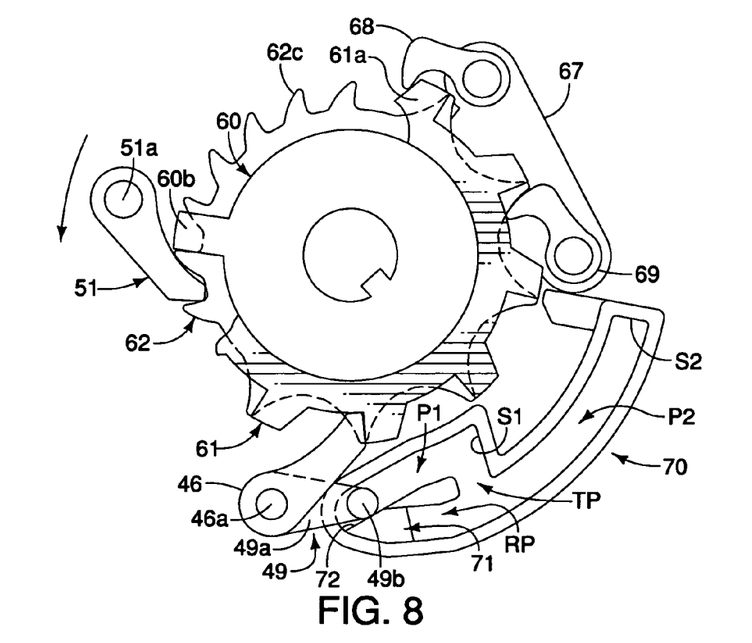
FIG. 8 is a simplified top plan view of the selected parts of the shift position control mechanism illustrated in FIG. 7, with the positioning pawl moved into engagement with the positioning plate.
Figure 9:
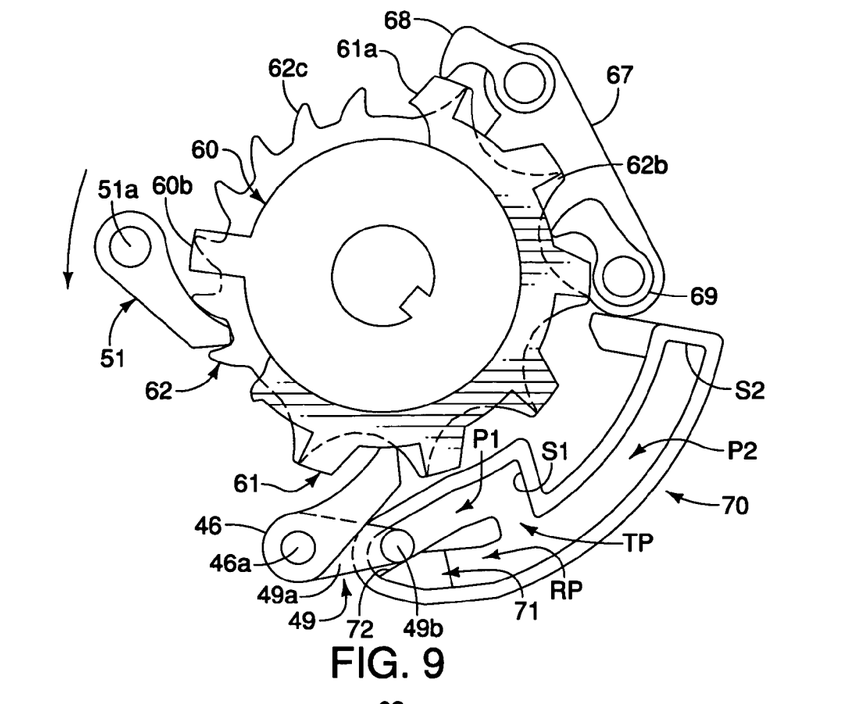
FIG. 9 is a simplified top plan view of the selected parts of the shift position control mechanism illustrated in FIGS. 7 and 8, with the positioning pawl rotating the positioning plate and the releasing plate.
Figure 10:
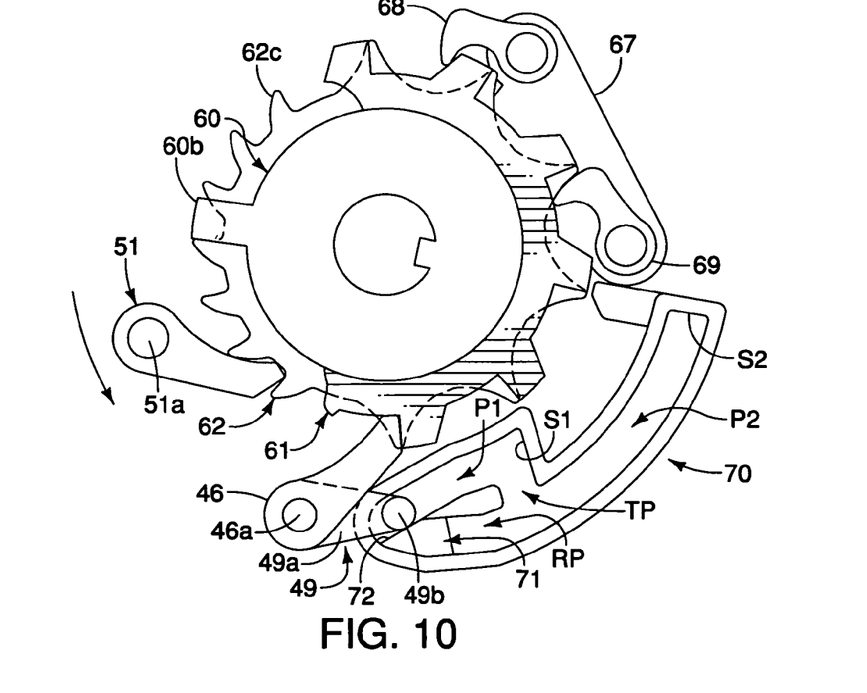
FIG. 10 is a simplified top plan view of the selected parts of the shift position control mechanism illustrated in FIGS. 7-9 in the third gear position, with the winding lever moved to a two gear shift position in the shift winding direction.
Figure 11:
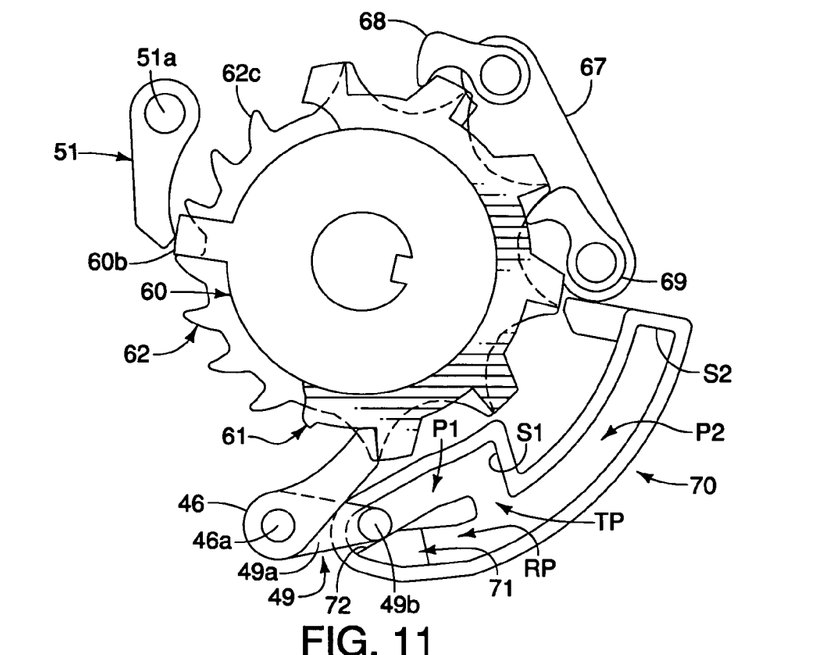
FIG. 11 is a simplified top plan view of the selected parts of the shift position control mechanism illustrated in FIGS. 7-10 in the third gear position, with the winding lever moved back to its final rest position.

As best seen FIG. 6, the shifting unit 33 basically includes a housing 40, a shift wire releasing assembly 41, a shift wire winding assembly 42 and a bicycle shift position control mechanism 43. The shifting unit 33 is configured and arranged such that the inner wire 18a of the shift control cable 18 can be pulled and released to selectively effect either a single-stage gear shift operation or a two-stage gear shift operation without the shift wire releasing assembly 41 or the shift wire winding assembly 42 returning to the rest position as explained below.

As best seen FIG. 6, the housing 40 of the shifting unit 33 basically includes an upper casing 40a and a lower casing 40b that are coupled together by a fastener or screw 44. The upper and lower casings 40a and 40b are preferably constructed of a lightweight material such a hard rigid plastic material. The housing 40 is sized and configured to form an internal cavity for receiving the shift wire releasing assembly 41, the shift wire winding assembly 42 and the bicycle shift position control mechanism 43 therein. The upper casing 40a is provided with an upper keyed shaft or post 40c, while the lower casing 40b is provided with a lower keyed shaft or post 40d. The posts 40c and 40d are designed to prevent rotational movement of selected parts of the shift unit 33 as will become apparent from the description below.

As best seen FIG. 6, the shift wire releasing assembly 41 of the shifting unit 33 basically includes a shift release lever 45 with a release pawl 46, a shift release lever return spring 47, a shift release lever control plate 48, and a guide member 49 that forms part of a release stroke controlling structure as explained below. On the other hand, the shift wire winding assembly 42 of the shifting unit 33 basically includes a shift winding lever 50 with a winding pawl 51, a shift winding lever return spring 52 and a shift winding lever control plate 53. The bicycle shift position control mechanism 43 of the shifting unit 33 basically includes a pawl cam plate 60, a releasing member or plate 61, a positioning (ratchet) member or plate 62, a wire take up member 63, a compression spring 64, a spacer 65, a wire take up release spring or biasing member 66, a mounting plate 67, a first position maintaining member or pawl 68, a second position maintaining member or pawl 69 and a guide slot 70 that forms part of a release stroke controlling structure as explained below.

The shift wire winding assembly 42 is configured and arranged such that the rider can easily operate the shift winding lever 50 to perform a shift winding operation as seen in FIGS. 7-11, while the shift wire releasing assembly 41 is configured and arranged such that the rider can easily operate the shift release lever 45 to perform a shifting operation as seen in FIGS. 11 to 17. The bicycle shift position control mechanism 43 of the shifting unit 33 cooperates with the shift wire releasing assembly 41 and the shift wire winding assembly 42 to control the releasing and pulling actions on the inner wire 18a. The release stroke controlling structure, as explained below, controls the movement of the shift release lever 45 so that the rider can selectively perform either a single gear shift operation or a double gear shift operation without returning the shift release lever 45 to its rest position (FIGS. 7-11).

Figure 16:
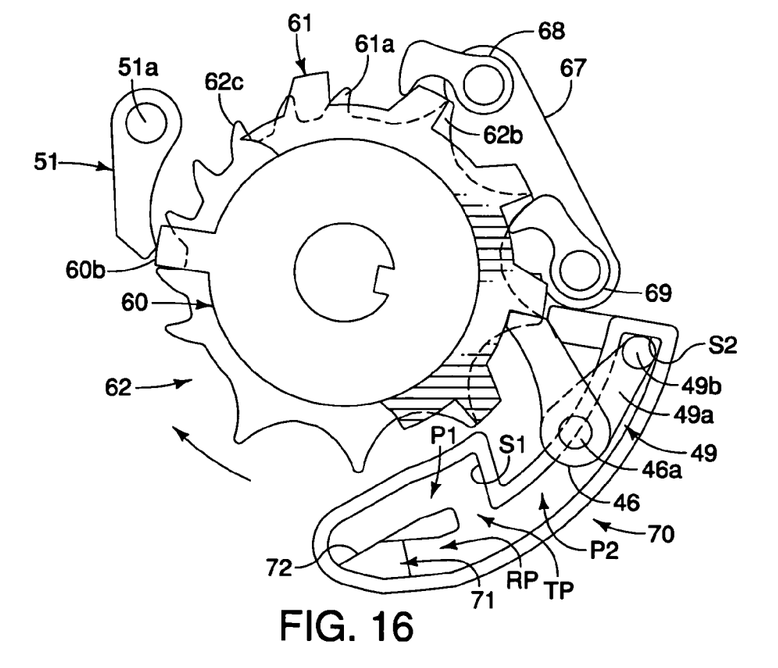
FIG. 16 is a simplified top plan view of the selected parts of the shift position control mechanism illustrated in FIGS. 7-15, with the guide pin in the second shift path and the guide pin contacting the second stop of the second shift path for completion of the shifting operation from the second gear position to the first gear position.
Figure 17:
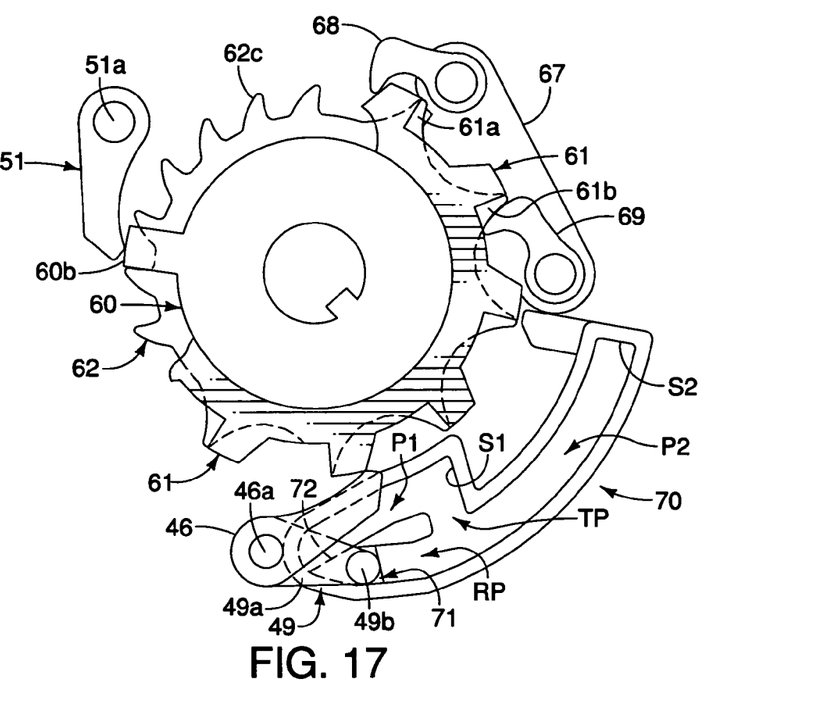
FIG. 17 is a simplified top plan view of the selected parts of the shift position control mechanism illustrated in FIGS. 7-15, with the guide pin moving along the return path such that the release lever returns to the rest position.

Turning first to the shift wire releasing assembly 41, the shift release lever 45 constitutes an operating member that is pivotally arranged to move from the rest position (FIGS. 7-11) to a first shifting position (FIGS. 12 and 13) and then optionally to a second shifting position (FIG. 16). The first shifting position is located between the rest position and the second shifting position with respect to movement of the shift release lever 45 (operating member) along a single operating direction. In particular, the guide member 49 that is coupled to the shift release lever 45 cooperates with the guide slot 70 that is coupled to the lower casing 40b to control the movement of the shift release lever 45 from the rest position to the first and second shifting positions.

As best seen in FIG. 6, the shift release lever 45 preferably has an internal mounting portion 45a and an external rider operating portion 45b. The internal mounting portion 45a is configured and arranged to pivot around the outer periphery of the upper post 40c such that the shift release lever 45 can move between a rest position and a shift release position. The internal mounting portion 45a preferably includes a mounting tab 45c and a stop flange 45d. The mounting tab 45c is configured and arranged to pivotally support the release pawl 46 and the guide member 49. The stop flange 45d is configured and arranged to maintain the shift release lever 45 in the rest position due to the biasing force of the release lever return spring 47. Thus, movement of the shift release lever 45 causes the release pawl 46 and the guide member 49 to rotate therewith about the center axis of the upper post 40c.

The release pawl 46 is mounted to the mounting tab 45c via a mounting pin 46a that is riveted onto the mounting tab 45c. The release pawl 46 is held on the mounting pin 46a by a retaining clip 46b. Moreover, the release pawl 46 is biased in a counterclockwise direction by a torsion spring 46c as seen in FIG. 6. The torsion spring 46c has a first end of the torsion spring 46c engaging the release pawl 46 and a second end of the torsion spring 46c engaging the guide member 49 such that the release pawl 46 and the guide member 49 are biased in opposite directions about the mounting pin 46a. As explained below, the release pawl 46 is configured and arranged to selectively engage the bicycle shift position control mechanism 43 when the shift release lever 45 is pivoted from its rest position to one of its shift release positions. In other words, the release pawl 46 is operatively coupled to the shift release lever 45 (operating member) to move in response to movement of the shift release lever 45.

The release lever return spring 47 is preferably a torsion spring having a first end 47a engaging the shift release lever 45 and a second end 47b engaging the shift release lever control plate 48. The release lever return spring 47 biases the shift release lever 45 in a clockwise direction as seen in FIG. 6. Accordingly, the shift release lever 45 and the release lever return spring 47 cooperate together such that the shift release lever 45 as a trigger action in which the shift release lever 45 automatically springs back to its rest position after being moved to a shift release position. Preferably, the first end 47a of the release lever return spring 47 is hooked on to the mounting tab 45c to bias the shift release lever 45 in the clockwise direction.

The shift release lever control plate 48 is preferably a flat plate with a center opening 48a that is keyed such that it engages the upper post 40c to prevent rotational movement therebetween. The shift release lever control plate 48 also has a hole 48b for receiving the second end 47b of the shift lever return spring 47 therein. A stop member or flange 48c is formed on the outer periphery of the shift release lever control plate 48 to act as a stop for the shift release lever 45. In particular, the stop flange 45d of the shift release lever 45 is normally biased against the stop member 48c.

As mention above, the guide member 49 and the guide slot 70 form the stroke controlling structure for controlling the movement of the release lever 45 from the rest position (FIGS. 7-11) to the first shifting position (FIGS. 12 and 13) and then optionally to the second shifting position (FIG. 16). The guide member 49 is movably mounted on the shift release lever 45 by the mounting pin 46a and biased radially away from the rotational axis of the shift release lever 45. Thus, the guide member 49 and the release pawl 46 have a common pivot axis. Moreover, the guide member 49 is biased in a clockwise direction about the mounting pin 46a by the torsion spring 46c as seen in FIG. 6. Thus, the release pawl 46 and the guide member 49 are biased in opposite directions about the common pivot axis formed by the mounting pin 46a. In particular, the guide member 49 is biased radially outwardly relative to the rotational axis of the shift release lever 45, while the release pawl 46 is biased radially inwardly relative to the rotational axis of the shift release lever 45.

Figure 4:
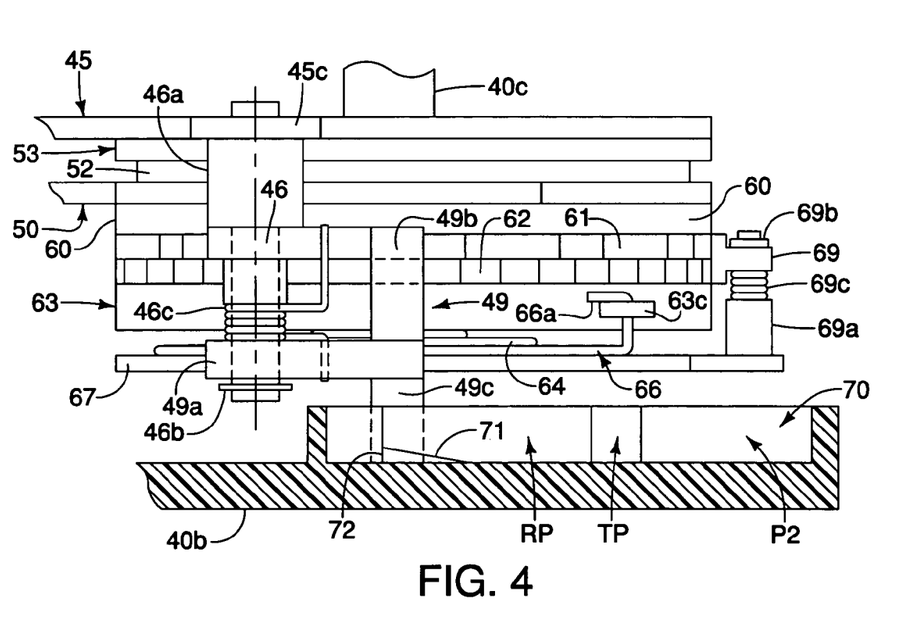
FIG. 4 is an elevational view of the bicycle control device illustrated in FIGS. 1 with selected portion broken away for purposes of illustration.
Figure 5:
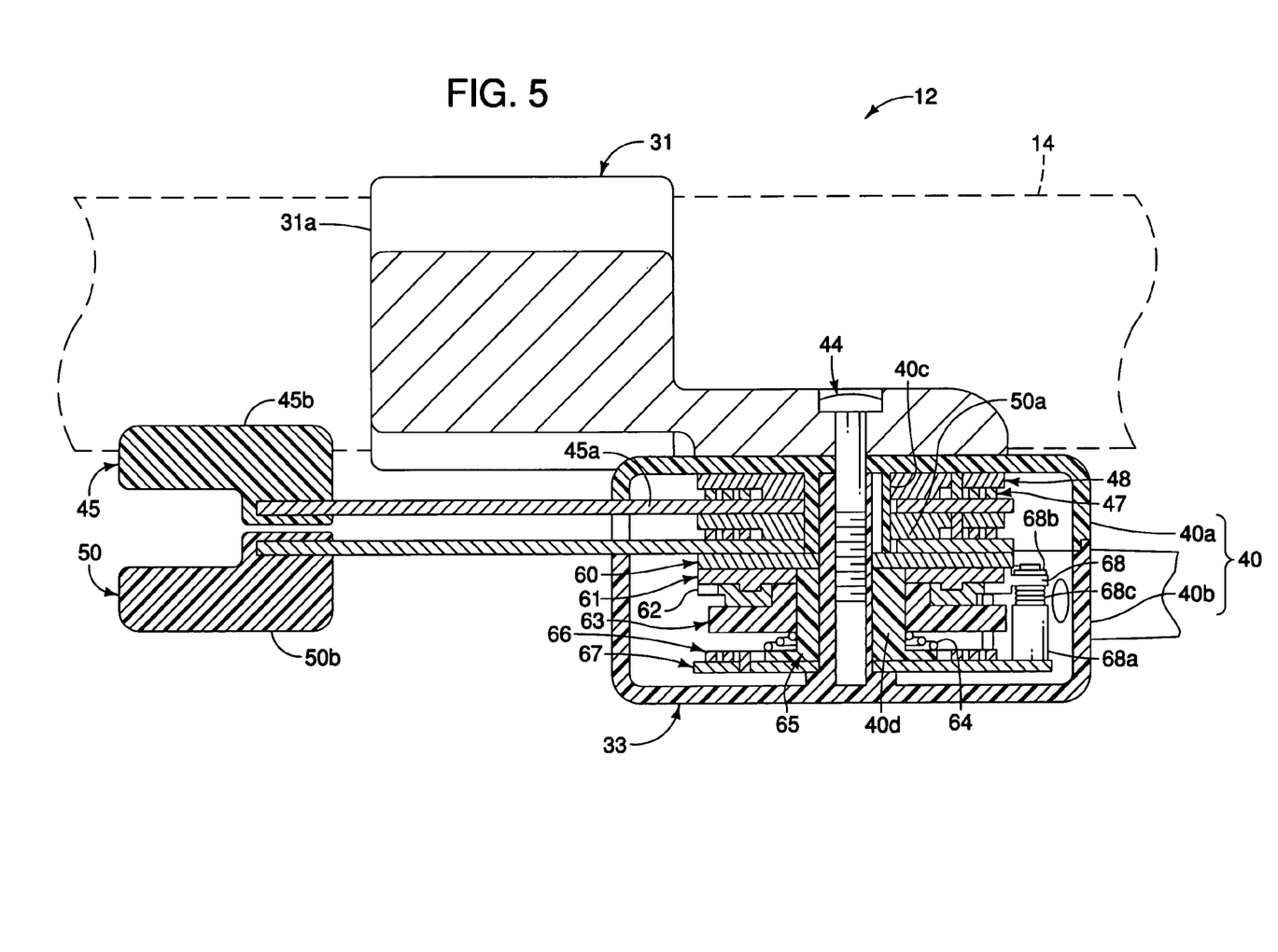
FIG. 5 is a partial cross sectional view of the bicycle control device as viewed along section line 5-5 of FIG. 3.
Figure 14:
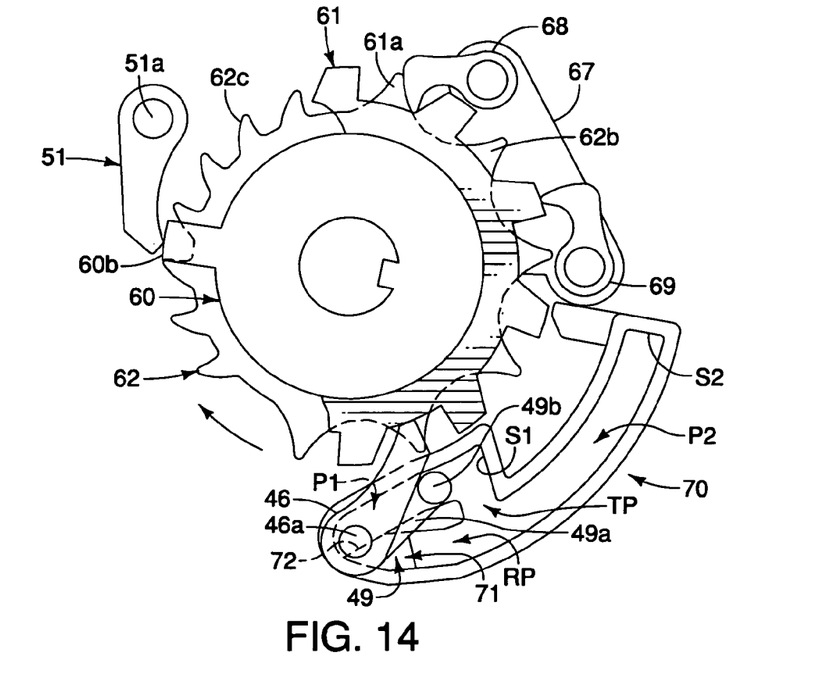
FIG. 14 is a simplified top plan view of the selected parts of the shift position control mechanism illustrated in FIGS. 7-13, with the release lever moved slightly rearward in a direction opposite to the shift winding direction such that the guide pin contacts the release pawl to prevent the release lever from moving back to the rest position.
Figure 18:
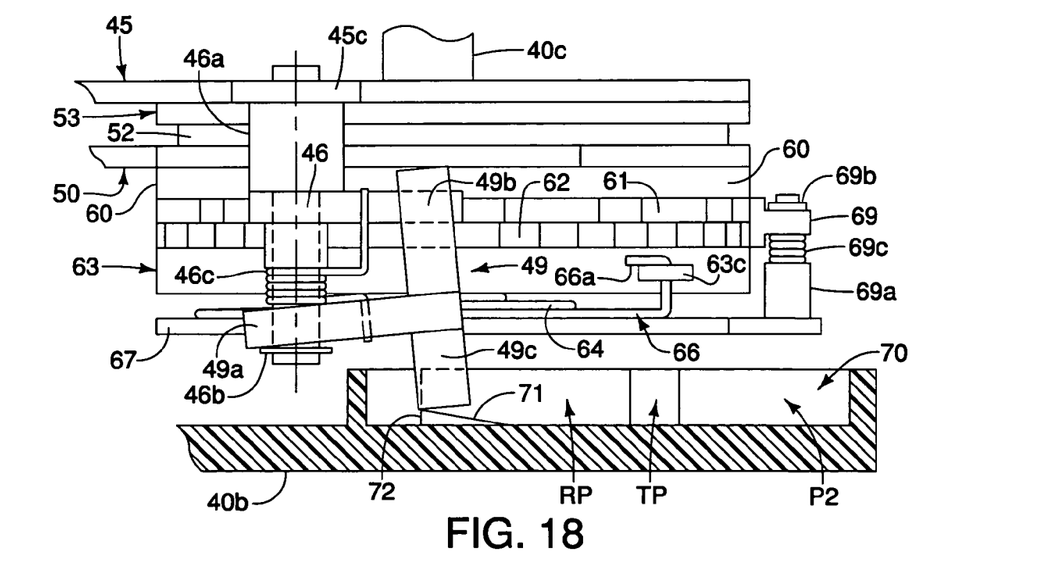
FIG. 18 is a simplified side elevational view of the selected parts of the shift position control mechanism illustrated in FIGS. 7-15, with the guide pin being tilted to ride over the ramp so that the release lever can return to the rest position.

As best seen in FIGS. 4 and 18, the guide member 49 has a mounting plate 49a with an upper stop pin 49b and a lower guide pin 49c. The mounting plate 49a is pivotally mounted on the mounting pin 46a of the shift release lever 45, with one end of the torsion spring 46c urging the guide member 49 in a clockwise direction about the mounting pin 46a. The upper stop pin 49b is configured and arranged to cooperate with the guide slot 70 to limit the pivotal movement of the release pawl 46 and to prevent the shift release lever 45 from improperly returning to the rest position as seen in FIG. 14. The lower guide pin 49c is configured and arranged to engage the guide slot 70 to control the stroke of the shift release lever 45 from the rest position to the first and second shifting positions and then back to the rest position.

Basically, the lower guide pin 49c and the guide slot 70 are configured and arranged to stop movement of the shift release lever 45 at the first shifting position when the shift release lever 45 is moved in the single progress operating direction from the rest position such that the release pawl engages the positioning (ratchet) member 62. The lower guide pin 49c and the guide slot 70 are further configured and arranged to control further movement of the operating member from the first shifting position to the second shift position when the shift release lever 45 is slightly moved in a non-operating direction away from the first shifting position such that the release pawl 46 operatively engages the positioning (ratchet) member 62 during pivoting of the shift release lever 45 from the first shifting position to the second shift position.

The guide slot 70 includes a generally z-shape with a first shifting path P1 formed from the rest position to a first stop S1, a transition path PT extending from the first shifting path P1 in a radial direction relative to the rotational axis of the wire take up member 63, and a second shifting path P2 formed from the transition path TP to the second stop S2. The guide slot 70 further includes a return path RP extending from the second shifting path P2 to the rest position.

The first stop S1 is configured and arranged to contact the guide pin 49c of the guide member 49 to stop movement of the shift release lever 45 at the first shifting position. The second stop S2 is configured and arranged to contact the guide pin 49c of the guide member 49 to stop movement of the shift release lever 45 at the second shifting position. In this embodiment, the first stop S1 is arranged radially inward from the second stop S2 relative to the rotational axis of the wire take up member 63.

As seen FIGS. 4 and 18, the guide slot 70 of the stroke controlling structure further includes a ramp member 71 that forms an abutment 72 that is configured and arranged to prevent radial outward movement of the guide member 49 when the shift release lever 45 is in the rest position. Thus, the abutment 72 ensures that the guide pin 49c of the guide member 49 moves along the first shifting path P1 and not along the return path RP, during movement of the shift release lever 45 in the single operating direction from the rest position. The guide member 49 is mounted on the mounting pin 46a such that the guide member 49 can tilt as the guide pin 49c of the guide member 49 rides over the ramp member 71 when the shift release lever 45 is returning to the rest position under the force of the return spring 47.

The shift winding lever 50 basically includes an internal mounting portion 50a and an external rider operating portion 50b. The internal mounting portion 50a is configured and arranged to pivot around the outer periphery of the upper post 40c such that the shift winding lever 50 can move between a rest position and a shift winding position. The internal mounting portion 50a preferably includes a mounting tab 50c for pivotally supporting the winding pawl 51 and a stop flange 50d for maintaining the shift winding lever 50 in the rest position due to the biasing force of the winding lever return spring 52. Thus, movement of the shift winding lever 50 causes the winding pawl 51 to rotate therewith about the center axis of the upper post 40c.

The winding pawl 51 is mounted to the mounting tab 50c via a mounting pin 51a that is riveted onto the mounting tab 50c. The winding pawl 51 is held on the mounting pin 51a by a retaining clip 51b. Moreover, the winding pawl 51 is biased in a counterclockwise direction by a torsion spring 51c as seen in FIG. 6. The torsion spring 51c has a first end of the torsion spring 51c engaging the winding pawl 51 and a second end of the torsion spring 51c engaging the mounting tab 50c of the shift winding lever 50. As explained below, the winding pawl 51 is configured and arranged to selectively engage the bicycle shift position control mechanism 43 when the shift winding lever 50 is pivoted from its rest position to a shift position.

The winding lever return spring 52 is preferably a torsion spring having a first end 52a engaging the shift winding lever 50 and a second end 52b engaging the shift winding lever control plate 53. The winding lever return spring 52 biases the shift winding lever 50 in a clockwise direction as seen in FIG. 6. Accordingly, the shift winding lever 50 and the winding lever return spring 52 cooperate together such that the shift winding lever 50 as a trigger action in which the shift winding lever 50 automatically springs back to its rest position after being moved to a shift position. Preferably, the first end 52a of the winding lever return spring 52 is hooked on to the mounting tab 50c to bias the shift winding lever 50 in the clockwise direction.

The shift winding lever control plate 53 is preferably a flat plate with a center opening 53a that is keyed such that it engages the upper post 40c to prevent rotational movement therebetween. The shift winding lever control plate 53 also has a hole 53b for receiving the second end 52b of the winding lever return spring 52 therein. A stop member or flange 53c is formed on the outer periphery of the shift winding lever control plate 53 to act as a stop for the shift winding lever 50. In particular, the stop flange 50d of the shift winding lever 50 is normally biased against the stop member 53c.

The pawl cam plate 60 is a flat rigid metal plate that is fixed to the housing 40 so that it does not rotate or move. In particular, the pawl cam plate 60 has a center opening 60a that is keyed so as to mate with the post 40c of the upper casing 40a. Of course, other non-circular cross sections can be utilized to prevent relative rotation between the pawl cam plate 60 and the housing 40. The pawl cam plate 60 preferably includes a winding pawl holding projection 60b. The pawl holding projection 60b is preferably formed peripheral edge of the pawl cam plate 60. The winding pawl holding projection 60b is configured and arranged to hold the winding pawl 51 in a disengaged or rest position against the biasing force of the spring 51c.

The releasing member or plate 61 is preferably a flat metal plate that is mounted on the post 40d to rotate around the peripheral surface of the post 40d. The releasing member 61 is configured and arranged to selectively move the first position maintaining pawl 68 between a first engagement position and a first disengagement position, and to selectively move the second position maintaining pawl 69 between a second engagement position and a second disengagement position as will become apparent from the following discussion. Moreover, the releasing member 61 is configured and arranged to selectively release the positioning member 62 from the first and second position maintaining pawls 68 and 69 to cause the positioning member 62 to rotate one shift position of the predetermined shift positions when the releasing member 61 is moved a first predetermined amount by the shift release lever 45, and to cause the positioning member to rotate two consecutive shift positions of the predetermined shift positions when the releasing member 61 is moved a second predetermined amount in a single progressive shift operation of the shift release lever 45.

The release plate 61 is rotated in a counterclockwise direction by both the shift release lever 45 and the shift winding lever 50. Preferably, the shift release lever 45, and the shift winding lever 50 and the releasing member 61 are configured and arranged such that two gear shift operations are possible using either the shift release lever 45 or the shift winding lever 50 without moving either the shift release lever 45 or the shift winding lever 50 to the rest position. The releasing member 61 includes a plurality of camming teeth 61a and a plurality of ramp shaped detents 61b.

These camming teeth 61a are selectively engaged by the release pawl 46 for rotating the releasing member 61. These camming teeth 61a also selectively engage the first and second position maintaining pawls 68 and 69 during a shifting operation of either the shift release lever 45 or the shift winding lever 50. During a shifting operation of either the shift release lever 45 or the shift winding lever 50, the camming teeth 61a selectively move the first and second position maintaining pawls 68 and 69 into and out of engagement with the positioning member 62 such that the wire take up member 63 can be selectively held in one of the nine different shift positions.

The ramp shaped detents 61b are circumferentially spaced apart on its lower surfaces to form part of a one way clutch that cooperates with the positioning member 62. In particular, the ramp shaped detents 61b engages the positioning member 62 so that the positioning member 62 can rotate in a counterclockwise direction relative to the releasing member 61 when the releasing member 61 is rotated by the shift release lever 45 and so that the releasing member 61 and the positioning member 62 rotate together when the positioning member 62 is rotated by the shift winding lever 50.

When the shift release lever 45 is in the rest position, the release pawl 46 has its tooth resting on the releasing member 61 and engaging one of the camming teeth 61a of the releasing member 61. When the shift winding lever 50 rotates the positioning member 62, the release pawl 46 ratchets over the camming teeth 61a of the releasing member 61. Thus, the releasing member 61 constitutes a ratchet member with respect to the release pawl 46 and the camming teeth 61a constituting a plurality of ratchet teeth that are selectively engaged by the release pawl 46.

Figure 12:
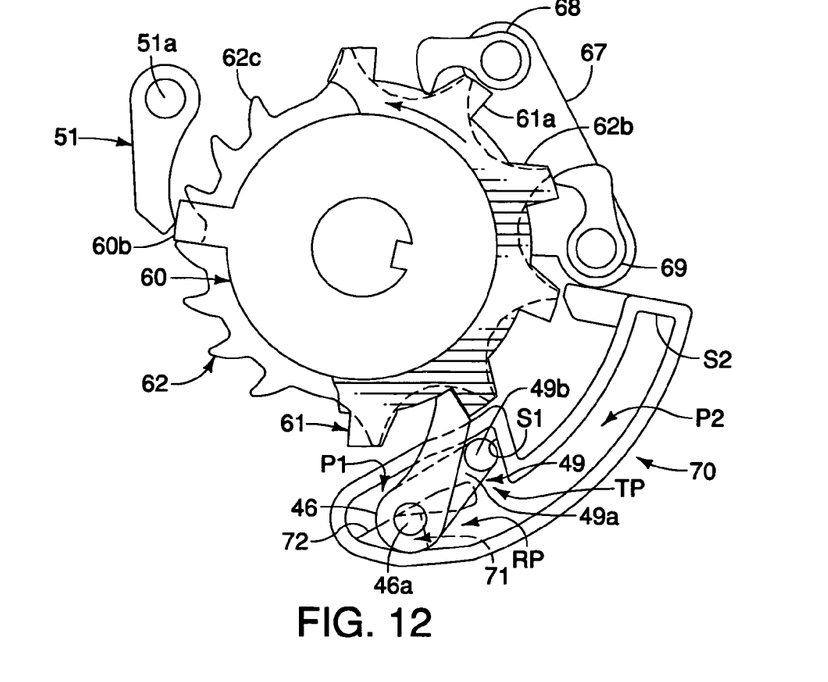
FIG. 12 is a simplified top plan view of the selected parts of the shift position control mechanism illustrated in FIGS. 7-11, with the release pawl of the release lever rotating the releasing plate in the shift winding direction such that one of the position maintaining pawls is moved out of engagement with the positioning plate and the other position maintaining pawl moves in the path of the positioning plate for shifting from the third gear position to the second gear position.
Figure 13:
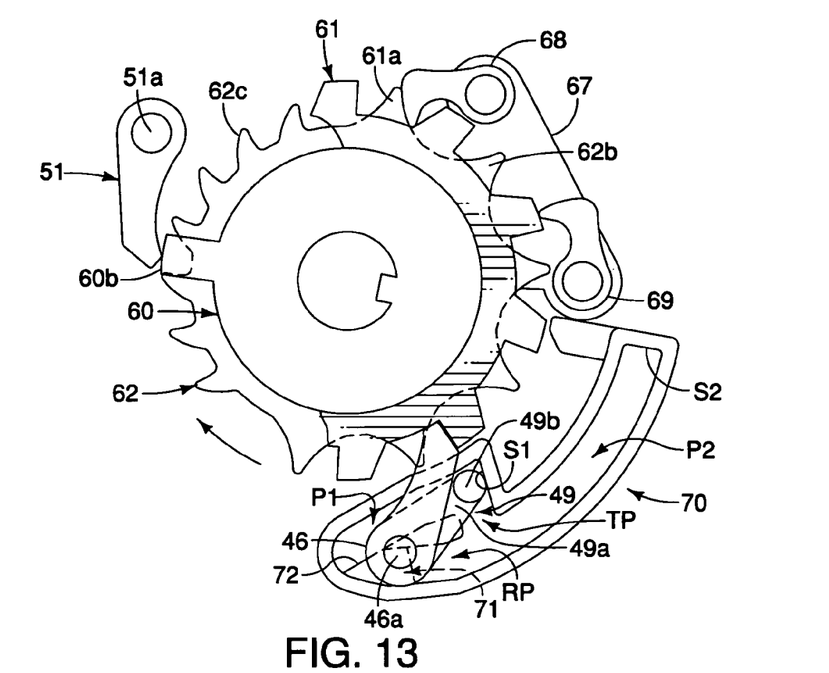
FIG. 13 is a simplified top plan view of the selected parts of the shift position control mechanism illustrated in FIGS. 7-12 in the second gear position, after the positioning plate has move one gear position, and the guide pin contacting the first stop of the first shift path for completion of the shifting operation from the third gear position to the second gear position.
Figure 15:
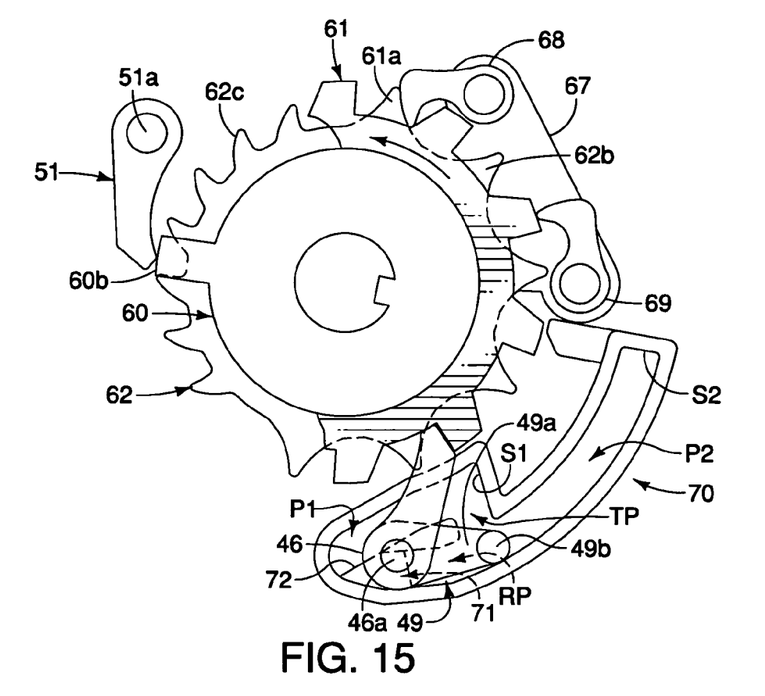
FIG. 15 is a simplified top plan view of the selected parts of the shift position control mechanism illustrated in FIGS. 7-14, with the guide member pivoted outwardly such that the guide pin moves from the first shift path into the second shift path so that the release lever can be moved to perform a second release operation without the release lever returning to the rest position.

The guide member 49 and the guide slot 70 are configured and arranged to stop movement of the shift release lever 45 at the first shifting position when the shift release lever 45 is progressively moved in the single operating direction from the rest position such that the release pawl 46 engages one of the ratchet or camming teeth 61a of the releasing member 61 as seen in FIGS. 12 and 13. The guide member 49 and the guide slot 70 are further configured and arranged to control further movement of the shift release lever 45 from the first shifting position to the second shift position when the shift release lever 45 is moved in a non-operating direction away from the first shifting position such that the release pawl 46 operatively engages the same of the ratchet or camming teeth 61a of the releasing member 61 during pivoting of the shift release lever 45 from the first shifting position to the second shift position as seen in FIGS. 14 and 15. The guide member 49 further cooperates with the guide slot 70 to restrict pivotal movement of the release pawl 46 out of engagement from the ratchet teeth when the shift release lever 45 is in an intermediate position between the rest position and the first shifting position as seen in FIG. 14.

The positioning member or plate 62 is preferably a flat metal plate that is freely rotatable about the post 40d. The positioning member 62 is fixed to the wire take up member 63 such that they rotate together in response to movement of either the shift release lever 45 or the shift winding lever 50. More specifically, the positioning member 62 is biased in a clockwise direction by the wire take up release spring 66, but normally held in one of the nine shift positions by either the first position maintaining pawl 68 or the second position maintaining pawl 69.

The positioning member 62 preferably includes a non-circular opening 62a that is configured and arranged to mate with the wire take up member 63 to prevent relative rotation therebetween. Preferably, the peripheral surface of the positioning member 62 is provided with six shift positioning teeth 62b and ten shift winding teeth 62c. The shift positioning teeth 62b are configured and arranged to selectively engage the first and second position maintaining pawls 68 and 69 such that the wire take up member 63 can be selectively held in one of the nine different shift positions. The shift winding teeth 62c are configured and arranged to be selectively engaged by the tooth of the winding pawls 51 of the shift winding lever 50. Thus, the positioning member 62 constitutes a ratchet member with the shift winding teeth 62c constituting a plurality of ratchet teeth that are selectively engaged by the winding pawl 51.

The positioning member 62 also includes a plurality of ramp shaped recesses 62d which engage the ramp shaped detents 61b to allow rotational movement in only one direction. In particular, the ramp shaped detents 61b and the ramp shaped recesses 62d cooperate together with the compression spring 64 to form the one way clutch that was mentioned above. Thus, the positioning member 62 rotates independently in a clockwise direction relative to the releasing member 61 when the releasing member 61 is rotated, but the releasing member 61 and the positioning member 62 move together in the counterclockwise direction when the positioning member 62 is rotated. In other words, the releasing member 61 is fixed to the positioning member 62 by the ramp shaped detents 61b and the ramp shaped recesses 62d when the positioning member 62 is rotated in the counterclockwise direction by the winding pawl 51 engaging one of the shift winding teeth 62c. However, the positioning member 62 rotates relative to the releasing member 61 when the releasing member 61 is rotated in a counterclockwise direction and the positioning member 62 is rotated in the clockwise direction by the wire take up release spring 66.

In particular, when the shift winding lever 60 is rotated from its rest position to the shift position, then the winding pawl 51 moves off of the winding pawl holding projection 60b and moves into engagement with the shift winding teeth 62c so as to rotate the positioning member 62. Since the positioning member 62 is connected to the wire take up member 63, the positioning member 62 and the wire take up member 63 move together. Also, due to the one way clutch form between the releasing member 61 and the positioning member 62, the releasing member 61 and the positioning member 62 also rotate together in response to movement of the shift winding lever 50.

The wire take up member 63 is a conventional type wire take up spool in which the inner wire 18a is round along the peripheral edge surface of the wire take up member 63 as the wire take up member 63 is rotated in a counterclockwise direction. The wire take up member 63 is configured and arranged to rotate about the rotational axis of the post 40d in a wire winding direction in response to the movement of the shift winding lever 50 along the single operating direction, and rotate about the rotational axis of the post 40d in a wire unwinding or non-operating direction in response to the movement of the shift release lever 45 along the single operating direction.

In particular, the wire take up member 63 has a center opening 63a that is rotatably mounted on the post 40d. The peripheral edge of the wire take up member 63 has a wire attachment opening 63b for attaching the inner wire 18a of the shift cable 18 thereto. Also, the peripheral edge of the wire take up member 63 has a hook member 63c for attaching the wire take up release spring 66 thereto. Thus, the wire take up release spring 66 biases the wire take up member 63 in a clockwise direction, i.e., a shift release direction. The upper surface of the wire take up member 63 has a plurality of projections 63d which engage a plurality of recesses formed in the opening 62a of the positioning member 62. Thus, the positioning member 62a and the wire take up member 63 are coupled together so as that they rotate together as a unit when the shifting unit 33 is in the assembled state.

The wire take up release spring 66 is preferably a torsion spring having a first end 66a attached to the hook 63c of the wire take up member 63, and a second end 66b coupled to the mounting plate 67. The wire take up release spring 66 applies a biasing force to urge the wire take up member 63 in the clockwise direction.

The spacer 65 is a hat shaped member having a flat base plate 65a and a tubular member 65b. The base member 65a is configured and arranged so as to prevent the wire take up release spring 66 from being compressed when the shift unit 33 is assembled. The tubular portion 65b is non-rotatably secured to the lower post 40d and maintains proper spacing between the wire take up member 63 and the compression spring 64.

The first position maintaining pawl 68 is fixedly coupled to the mounting plate via a pin 68a which is riveted onto the mounting plate 67. The first position maintaining pawl 68 is held on the mounting pin 68a by a retaining clip 68b. Moreover, the first position maintaining pawl 68 is biased in a counterclockwise direction by a torsion spring 68c as seen in FIG. 6. The torsion spring 68c has a first end of the torsion spring 68c engaging the first position maintaining pawl 68 and a second end of the torsion spring 68c engaging the mounting plate 67. Thus, the first position maintaining pawl 68 configured and arranged to selectively move between a first engagement position that holds the positioning member 62 in one of the predetermined shift positions and a first disengagement position that releases the positioning member 62 for rotational movement.

The second position maintaining pawl 69 is fixedly coupled to the mounting plate via a pin 69a which is riveted onto the mounting plate 67. The second position maintaining pawl 69 is held on the mounting pin 69a by a retaining clip 69b. Moreover, the second position maintaining pawl 69 is biased in a counterclockwise direction by a torsion spring 69c as seen in FIG. 6. The torsion spring 69c has a first end of the torsion spring 69c engaging the second position maintaining pawl 69 and a second end of the torsion spring 69c engaging the mounting plate 67. Thus, the second position maintaining pawl 69 configured and arranged to selectively move between a second engagement position that holds the positioning member 62 in one of the predetermined shift positions and a second disengagement position that releases the positioning member 62 for rotational movement.

The first and second position maintaining pawls 68 and 69 are configured and arranged to alternately engage adjacent teeth of the positioning member 62 as the first and second position maintaining pawls 68 and 69 are moved by the rotation of the release plate to perform a shifting operation between sequential shift positions of the predetermined shift positions.

As seen in FIGS. 7 to 11, a shift operation from the first gear position to the third gear position is illustrated in which the positioning member 62 and the releasing member 61 are rotated together by the rider pushing the shift winding lever 50. In particular, the rotation of the releasing member 61 and the positioning member 62 causes the first and second position maintaining pawls 68 and 69 to be moved and/or held out of engagement with the positioning teeth 62b of the positioning member 62 by one of the camming teeth 61a of the releasing member 61 against the urging force of the springs 68c and 69c. Once the releasing member 61 and the positioning member 62 have been moved a predetermined amount, one of the first and second position maintaining pawls 68 and 69 will be forced back into the path of the positioning teeth 62b of the positioning member 62 by the urging force of its springs 68c or 69c, while the other of the first and second position maintaining pawls 68 and 69 will be held out of engagement from the positioning teeth 62b of the positioning member 62 by one of the camming teeth 61a of the releasing member 61. This shifting can be performed in a single progressively movement of the shift winding lever 50 without stopping or returning to the shift winding lever 50 to the rest position such that two gears shifts occur in the single shift operation.

Referring to FIGS. 11 to 17, a release shift operation from the third gear position to the first gear position is illustrated in which the releasing member 61 is rotated together by the rider pushing the shift release lever 45. In particular, the rotation of the releasing member 61 causes the first and second position maintaining pawls 68 and 69 to be moved and/or held out of engagement with the positioning teeth 62b of the positioning member 62 by one of the camming teeth 61a of the releasing member 61 against the urging force of the springs 68c and 69c. Once the releasing member 61 has been moved a predetermined amount, one of the first and second position maintaining pawls 68 and 69 will be forced back into the path of the positioning teeth 62b of the positioning member 62 by the urging force of the springs 68c and 69c, while the other of the first and second position maintaining pawls 68 and 69 will be held out of engagement from the positioning teeth 62b of the positioning member 62 by one of the camming teeth 61a of the releasing member 61. This shifting can be performed in a single progressively movement of the shift release lever 45 without stopping or returning to the shift release lever 45 to the rest position such that two gears shifts occur in the single shift operation.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift control device comprising:
an operating member pivotally arranged to move between a rest position, a first shifting position and a second shifting position with the first shifting position being located between the rest position and the second shifting position with respect to movement of the operating member along a single operating direction;
a release pawl operatively coupled to the operating member to move in response to movement of the operating member;
a ratchet member including a plurality of ratchet teeth that are selectively engaged by the release pawl;
a wire take up member configured and arranged to rotate about a rotational axis in response to movement of the ratchet member by the release pawl in response to the movement of the operating member along the single operating direction; and
a stroke controlling structure including a guide member configured and arranged to stop movement of the operating member at the first shifting position when the operating member is progressive moved in the single operating direction from the rest position such that the release pawl engages one of the ratchet teeth, and the guide member being further configured and arranged to control further movement of the operating member from the first shifting position to the second shift position when the operating member is moved in a non-operating direction away from the first shifting position such that the release pawl operatively engages the one of the ratchet teeth during pivoting of the operating member from the first shifting position to the second shift position.

2. The bicycle shift control device according to claim 1, wherein
the guide member is movably mounted on the operating member.

3. The bicycle shift control device according to claim 1, wherein
the guide member and the release pawl are pivotally mounted to the operating member.

4. The bicycle shift control device according to claim 3, wherein
the guide member and the release pawl have a common pivot axis.

5. The bicycle shift control device according to claim 4, wherein
the guide member and the release pawl are biased in opposite directions about the common pivot axis.

6. The bicycle shift control device according to claim 1, wherein
the stroke controlling structure further includes a guide slot having a first stop arranged to contact a guide pin of the guide member to stop movement of the operating member at the first shifting position, and a second stop arranged to contact the guide pin of the guide member to stop movement of the operating member at the second shifting position.

7. The bicycle shift control device according to claim 6, wherein
the first stop is arranged radially inward from the second stop relative to the rotational axis of the wire take up member.

8. The bicycle shift control device according to claim 7, wherein
the guide member is movably mounted on the operating member and biased radially away from the rotational axis of the wire take up member.

9. The bicycle shift control device according to claim 8, wherein
the stroke controlling structure further includes an abutment configured and arranged to prevent radial outward movement of the guide member when the operating member is in the rest position.

10. The bicycle shift control device according to claim 6, wherein
the guide slot includes a generally z-shape with a first shifting path formed from the rest position to the first stop, a transition path extending from the first shifting path in a radial direction relative to the rotational axis of the wire take up member, and a second shifting path formed from the transition path to the second stop.

11. The bicycle shift control device according to claim 10, wherein
the guide slot further includes a return path extending from the second shifting path to the rest position.

12. The bicycle shift control device according to claim 1, wherein
the guide member is configured and arranged to restrict pivotally movement of the release pawl out of engagement from the ratchet teeth when the operating member is in an intermediate position between the rest position and the first shifting position.

13. The bicycle shift control device according to claim 12, wherein
the guide member and the release pawl are pivotally mounted to the operating member.

14. The bicycle shift control device according to claim 12, wherein
the guide member and the release pawl are biased in opposite radial directions relative to the rotational axis of the wire take up member.

15. The bicycle shift control device according to claim 12, wherein
the stroke controlling structure further includes a guide slot having a first stop arranged to contact a guide pin of the guide member to stop movement of the operating member at the first shifting position, and a second stop arranged to contact the guide pin of the guide member to stop movement of the operating member at the second shifting position.

16. The bicycle shift control device according to claim 15, wherein
the first stop is arranged radially inward from the second stop relative to the rotational axis of the wire take up member.

17. The bicycle shift control device according to claim 15, wherein
the guide member is movably mounted on the operating member and biased radially away from the rotational axis of the wire take up member.

18. The bicycle shift control device according to claim 17, wherein
the stroke controlling structure further includes an abutment configured and arranged to prevent radial outward movement of the guide member when the operating member is in the rest position.

19. The bicycle shift control device according to claim 15, wherein
the guide slot includes a generally z-shape with a first shifting path formed from the rest position to the first stop, a transition path extending from the first shifting path in a radial direction relative to the rotational axis of the wire take up member, and a second shifting path formed from the transition path to the second stop.

20. The bicycle shift control device according to claim 19, wherein
the guide slot further includes a return path extending from the second shifting path to the rest position.

* * * * *